(No Model.)   7 Sheets—Sheet 1.

W. CALVER.
SOLAR APPARATUS.

No. 603,317.   Patented May 3, 1898.

Fig. 1.

Witnesses
Jas. E. Hutchinson.
L. C. Hills.

Inventor
William Calver
by E. B. Stocking
Attorney (No Model.)
7 Sheets—Sheet 2.

W. CALVER.
SOLAR APPARATUS.

No. 603,317. Patented May 3, 1898.

Witnesses
Jas. E. Hutchinson.
L. C. Hills

Inventor:
William Calver
by E. B. Stocking
Attorney (No Model.) 7 Sheets—Sheet 4.

W. CALVER.
SOLAR APPARATUS.

No. 603,317. Patented May 3, 1898.

Witnesses
Jas. E. Hutchinson
L. C. Hills

Inventor
William Calver;
by E. B. Stocking
Attorney

THE NORRIS PETERS CO., PHOTO-LITHO., WASHINGTON, D. C.

(No Model.) 7 Sheets—Sheet 5.

W. CALVER.
SOLAR APPARATUS.

No. 603,317. Patented May 3, 1898.

Witnesses
Jas. E. Hutchinson.
L. C. Hills.

Inventor
William Calver,
by E. B. Stocking
Attorney (No Model.)  7 Sheets—Sheet 6.
W. CALVER.
SOLAR APPARATUS.

No. 603,317. Patented May 3, 1898.

Witnesses
Jas. E. Hutchinson
L. C. Hills

Inventor:
William Calver,
by E. B. Stocking
Attorney (No Model.) 7 Sheets—Sheet 7.

W. CALVER.
SOLAR APPARATUS.

No. 603,317. Patented May 3, 1898.

Witnesses
Jas. E. Hutchinson
L. C. Hills

Inventor:
William Calver
by E. B. Stocking
Attorney

UNITED STATES PATENT OFFICE.

WILLIAM CALVER, OF WASHINGTON, DISTRICT OF COLUMBIA.

SOLAR APPARATUS.

SPECIFICATION forming part of Letters Patent No. 603,317, dated May 3, 1898.

Application filed October 23, 1895. Renewed October 9, 1897. Serial No. 654,705. (No model.)

*To all whom it may concern:*

Be it known that I, WILLIAM CALVER, a citizen of the United States, residing at Washington, in the District of Columbia, have invented certain new and useful Improvements in Solar Apparatus, of which the following is a specification, reference being had therein to the accompanying drawings.

This invention has relation to an apparatus for utilizing the solar rays; and it has as some of its objects the provision of means for the automatic control of the various necessary movements of parts of the apparatus, their adjustment, and the simplification of the structure.

In this instance the apparatus is represented as adapted for the production of steam, and in this regard it possesses novel and advantageous features, while at the same time the invention is capable of application for various and any other purposes for which the solar rays may be employed.

Other objects and advantages of the invention will appear in the following description, and the novel features thereof will be particularly pointed out in the claims.

Referring to the drawings.

Like letters refer to like parts in all the figures.

Figure 18:
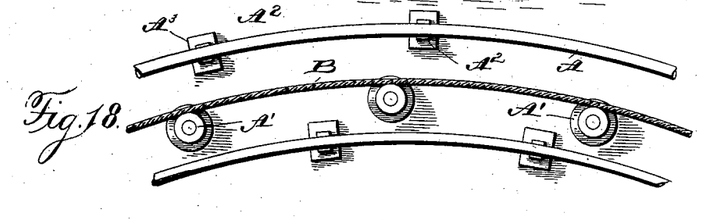
Fig. 18 is a plan of the track and its operating-cable.

A represents a circularly-disposed track having cable-guiding rollers A' arranged between the rails thereof. This track may be constructed of any suitable rails—in this instance a round rod $a$, surmounted by a flat bar $a'$ to constitute the rail, in order to give a broad flat bearing-surface—or the rail may be formed of the rod alone. (See Fig. 18.)

Figure 1:
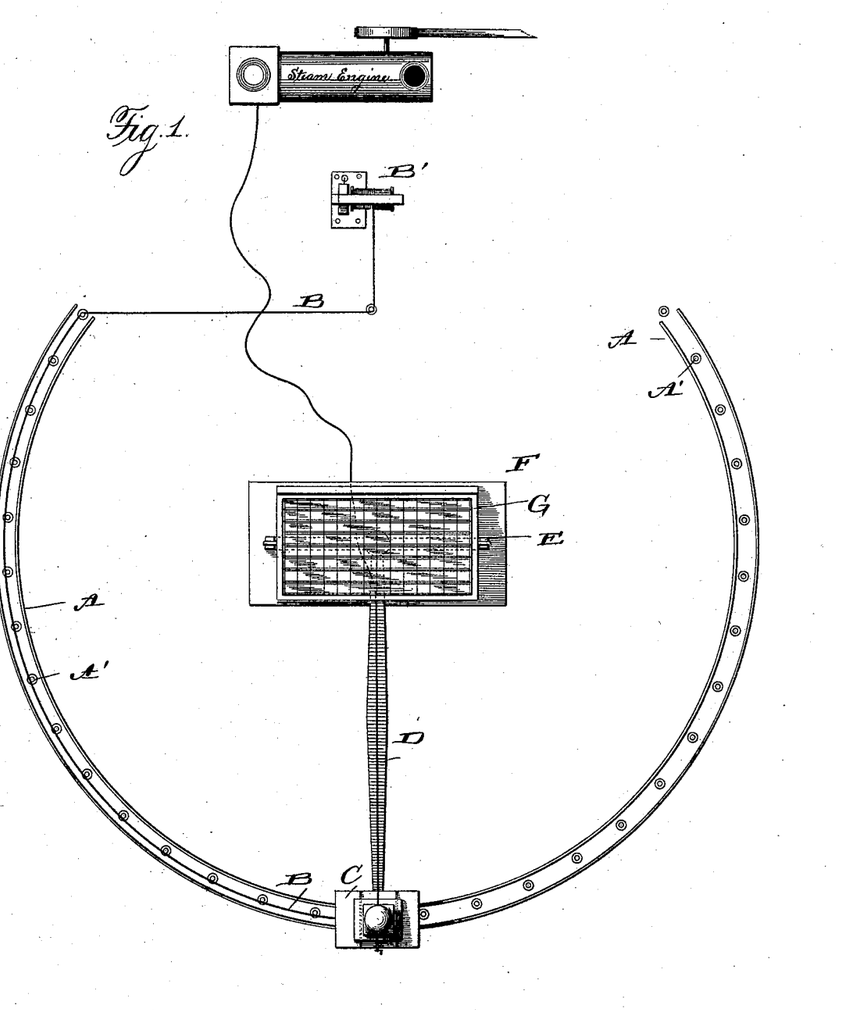
Figure 1 is a diagrammatic plan of an apparatus embodying my invention and adapted for the production of steam.
Figure 2:
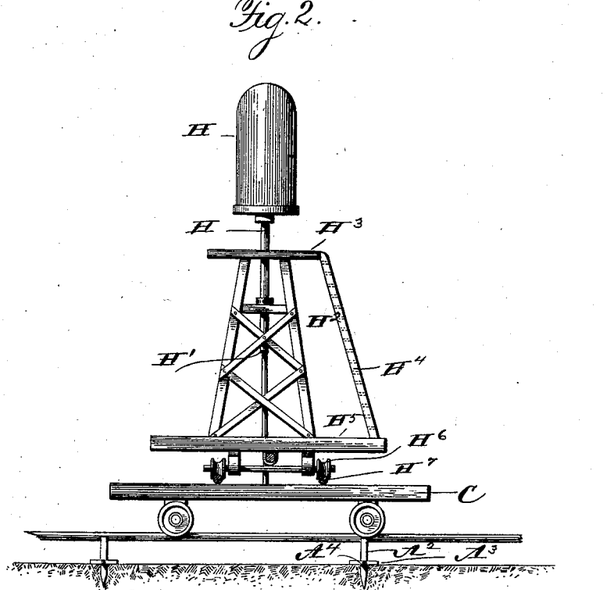
Fig. 2 is an elevation of the circular track, a truck adapted to traverse the same, and a secondary truck or car upon which are mounted a boiler and platform giving access to said boiler.
Figure 17:
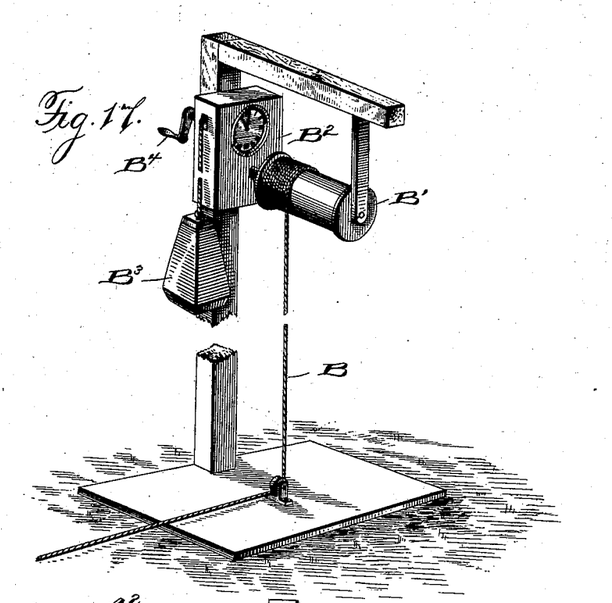
Fig. 17 is a perspective of the motive power for moving the car and truck upon the circular track.
Figure 19:
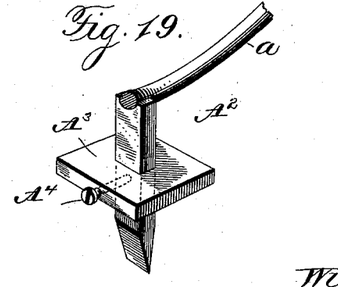
Fig. 19 is a detail of means employed for adjusting the track.

$A^2$ represents posts passing through the bed-plates $A^3$, (see Figs. 18 and 19,) which rest upon the surface of the earth or other prepared surface and are provided with an adjusting means $A^4$, embodied in the bed-plate $A^3$ and bearing against the post $A^2$, whereby the elevation or depression of the track may readily be secured in that the post may be inserted into the ground any desired distance maintained by the bed-plate adjustably but securely connected with the post. The flanged pulleys A' are mounted upon suitable spindles $A^5$, secured to bases $A^6$, and these secured in plates between the rails for the purpose of guiding the car C, having wheels adapted to the rails employed and preferably flanged to retain them on the rails. The cable B extends from the car to a windlass B', (see Figs. 1 and 17,) said windlass being suitably connected with clockwork $B^2$, which is operated by a weight $B^3$ sufficient to wind the cable upon the windlass and move the car C with any load thereon. A crank $B^4$ serves the purpose of rewinding the clockwork. The usual clock-escapement permits the gradual fall of the weight in regulated time, whereby the car is moved about the circularly-disposed track regularly and in time with the movement of the sun, which is the source of the heat employed by the apparatus.

As it is desirable to provide for the irregular apparent motion of the sun in right ascension, which is greatest at noon and least at morning and evening, I have shown in Figs.

Figure 16:
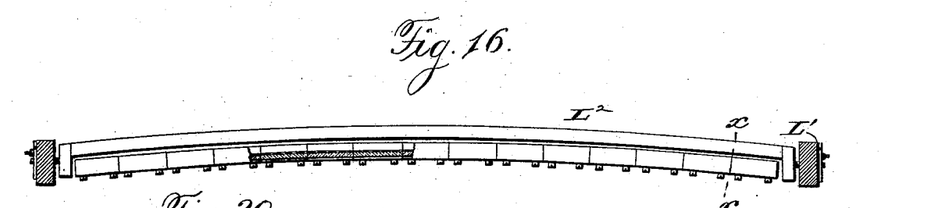
Figures 16A, 20, 21, 22:
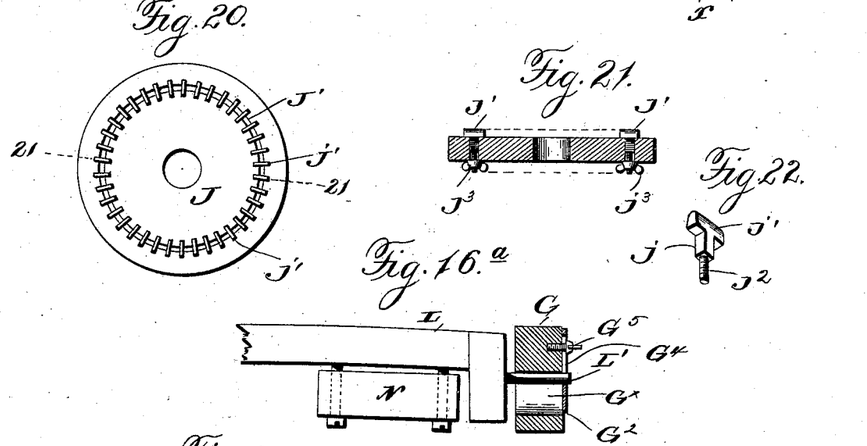
Fig. 20 is an enlarged face view of the gear of the base, having its toothed portion formed of removable and adjustable pins or projections.
Fig. 21 is a section through Fig. 20 on the line 21 21 thereof.
Fig. 22 is a perspective view of one of the pins removed.
Figure 23:
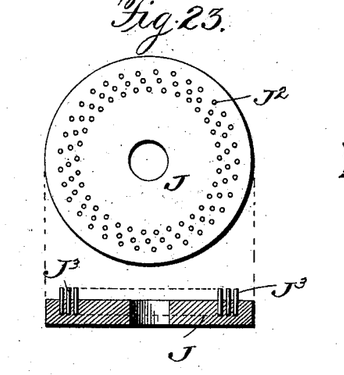
Fig. 23 shows in elevation and section a modified form of gear.

20 and 23 a provision for this purpose. In Figs. 20 and 21 I have illustrated the gear J, which is that designed to be fast upon the base or platform, as constructed with a body portion having an annular groove J', in which are fitted the shanks $j$ of the pins or projections $j'$, the upper faces of which are rounded to constitute the teeth of the gear, while their shanks are provided with the screw-threaded portion $j^2$, extended through the groove in the body portion of the gear to receive the thumbnuts $j^3$, by means of which the pins or projections may be held firmly in position and by the loosening of which the pins may be adjusted on the base to follow the irregular motion of the sun. This construction also provides for the replacement of a pin or cog in case the same should become broken. In Fig. 23 I have shown the body portion of the gear as formed with a plurality of annular rows of holes $J^2$ to receive the pins $J^3$, removably fitted therein, as seen in the sectional view, and which are designed to serve substantially the same function as the removable and adjustable pins or projections seen in Fig. 20.

Figure 3:
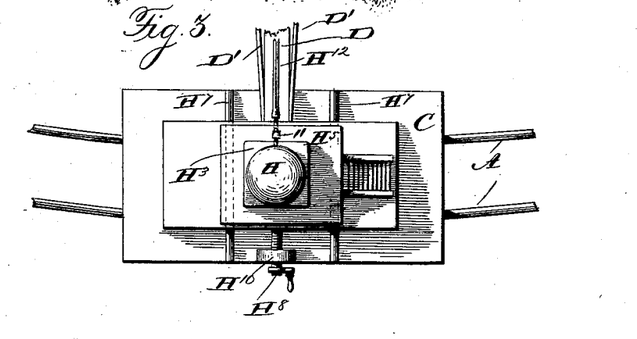
Fig. 3 is a plan of Fig. 2.

Extending from the truck to the center of the circularly-disposed track is a connecting-bar D, which may be of a single piece with or without strengthening-guys D' (see Fig. 3) and which is rigidly secured to the pivot-head E of the reflector-supporting frame E'. The battery of reflectors and its frame are so constructed as to pivot at the center of the track, and a platform F may be provided for this portion of the apparatus at that place.

G represents a battery of reflectors comprising reflectors of any suitable material and construction mounted in a frame having lateral journals G' fitted in bearings in the uprights of the frame E'. The battery-frame G is slotted at $G^\times$ for the reception of the journal or gudgeon L' of each of the individual reflecting-bars L of the series or battery. A plate $G^2$ (see Fig. 10) has an aperture $G^3$ for the reception of the journal L' and a slot $G^4$ for the reception of an adjusting-screw $G^5$, which is seated in the side of the frame G. A plate and adjusting-screw are employed at each end of each reflector-bar on the frame G, so that each bar may be adjusted inwardly and outwardly in order that the series of bars may be adjusted into a desired position forward and back with relation to each other. In this manner a reflecting-surface is secured which is substantially concave from top to bottom, and the bars being curved, as shown in Fig. 16, and the concavity extending also from side to side its form is always, of course, in reality a section of a parabola or what may be called its equivalent in flat surfaces.

As thus far described, it will be seen that the battery G will be rotated about its pivot E in unison with the travel of the car upon the track and that the latter will be controlled by the clock mechanism, so that the battery will be always properly presented toward the sun in order to properly reflect the rays thereof upon the car or any apparatus mounted thereon and that this function of the reflectors will be continuous so long as the clock is operating and the sun shining.

Upon the car C in this instance there is mounted a boiler H, which may be of any form of construction and supported upon the car in any suitable manner. In this instance the boiler H is supported at the upper end of a substantial water-supply pipe H', with which suitable connections from a source of supply may be made to be controlled in its service in accordance with the requirements of the case, which may be determined by the use of any usual indicator attached to the boiler, which may be also supplied with any usual pressure-indicator, if desired. The supply-pipe and boiler are supported upon a stand or trestle $H^2$, having a platform $H^3$ and a ladder $H^4$ for access to the platform. The base $H^5$ of this boiler-supporting structure is provided with a truck $H^6$, mounted on a track $H^7$, traversing the car C laterally. A threaded crank-shaft $H^8$, meshing with a nut $H^9$, secured to the base $H^5$ and mounted for rotation in a step $H^{10}$ on the car C, whereby the position of the truck, together with any structure thereon, with relation to the center of the track and the apparatus there located, may be varied, if desired. By this simple means of adjustment of the position of the object which receives the rays reflected from the battery the position of said object may be changed so as to subject different portions thereof to the more or less intense heat of those rays, and thus the heat utilized may be regulated and a more or less rapid or effective operation at this point of the apparatus secured. A pipe $H^{11}$ connects with the steam-boiler in any suitable manner for the purpose of conveying steam therefrom, and with this pipe a flexible or other hose or pipe $H^{12}$ is extended along the bar D to the center and from thence to a steam-engine or other apparatus for the utilization of the steam, all as clearly shown in Fig. 1. Any suitable system of controlling-valves may be employed in connection with the steam-supply and using apparatus.

Figures 4, 5:
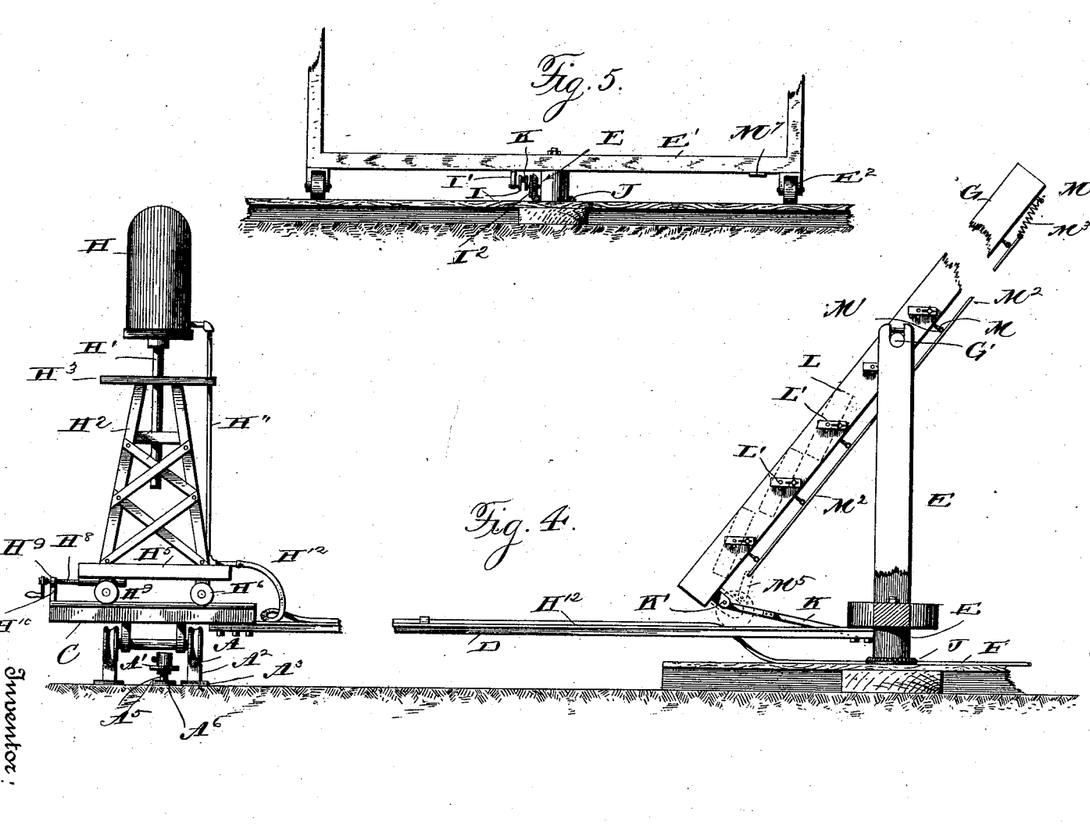
Fig. 4 is a side elevation of the entire apparatus with parts in section.
Fig. 5 is a partial elevation of the reflector-frame and mechanism for automatically adjusting a battery of reflectors.

By reference to Fig. 5 it will be seen that the battery-frame E' may be provided with casters $E^2$ and with a crank-shaft I, mounted in a bracket I', depending from the frame and in the pivot E of the frame. A gear J, of any suitable construction, is secured to the platform about the pivot E, and on the crank-shaft is mounted a coöperating gear $I^2$, which may be rigidly connected to the crank-shaft, so that in the revolution of the frame caused by the connection D with the car on the track motion will be imparted to the crank-shaft I and in proportion to the travel of the car on the track. A connecting-rod K, Figs. 4, 5, 6, and 12, extends from the crank-shaft to and is pivotally connected with the battery-frame G, as at K', for example. By this means the battery-frame G is inclined more or less in accordance with the travel of the car on the track, so that if said frame has the proper inclination to direct the solar rays upon an object on the car C in the morning the battery-frame will be changed in its inclination to follow the change in position of the sun as it approaches its highest point at midday while traveling upon the morning portion of the track and will be gradually returned to its first position while the car travels upon the afternoon portion of the track and in accordance with the natural course of the sun. This is accomplished by the direct connection of the rod K or its equivalent with suitable gearing actuated by the horizontal partial rotation of the battery-supporting frame.

Figures 6, 9, 10, 11, 12:
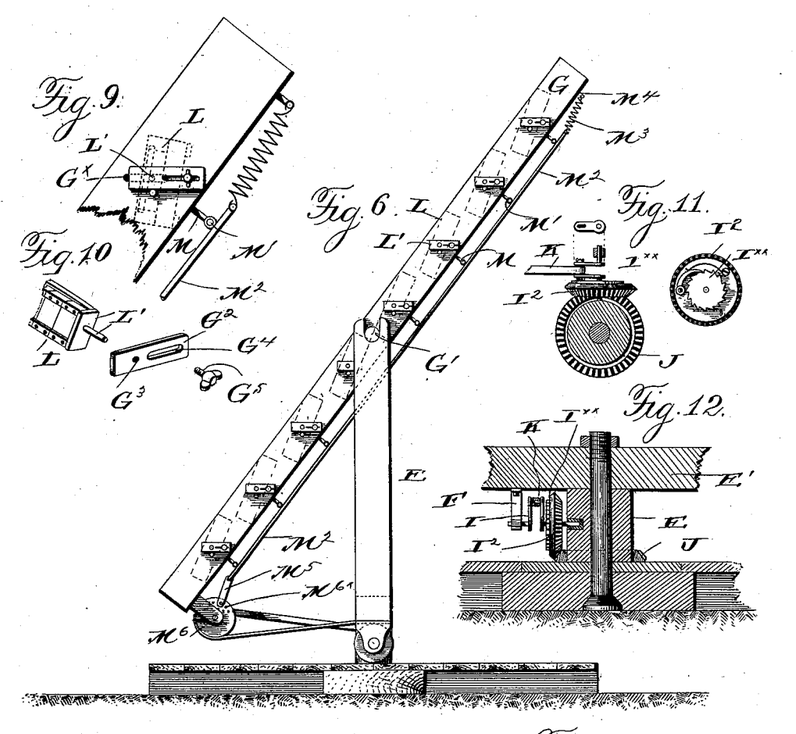
Fig. 6 is a side elevation of a battery of reflectors and its adjusting mechanism.
Figs. 7 to 12, inclusive, are details of the battery and adjusting mechanism.
Figure 8:
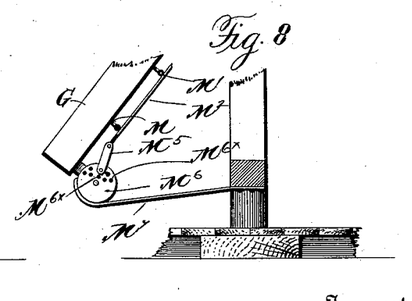

It being also desirable to provide for a still finer adjustment and regulation of the reflectors constituting the battery than the adjustment just described of the battery as a whole, I have devised means for accomplishing such finer adjustment, and it comprises a number of reflectors pivotally mounted and means for automatically adjusting said reflectors individually and collectively with relation to the position of the sun as it changes in its diurnal movement. This adjustment can be used in place of the motion of the large frame, which can be held at any convenient angle by removing the connecting-rod from the crank and attaching the connecting-rod to the base or support of the frame by a thumb-screw and attaching the strap to the crank in place of the rod. When used, as shown in the drawings, with the inclined movement of the large frame, it will reduce the movement necessary for the said frame and make the focus more uniform in size in either case. There are various well-known mechanical devices which may be employed for maintaining not only the adjustment of the battery as a whole, but of the individual members constituting the battery, and I therefore do not limit my invention to the exact details of construction which I herein show and describe, as they are illustrative of one of many forms of devices for accomplishing the purpose in view. In this instance I construct the reflectors in the form of oblong bars L, provided with suitable reflecting-surfaces and at the ends thereof with journals or gudgeons L'. These bars are indicated in Figs. 4, 6, and 9 by dotted lines. Projecting rearwardly from each bar is an arm M, pivoted at M' to a rod $M^2$, at the upper end of which is a retracting-spring $M^3$, extended to and connected with the battery-frame G at $M^4$. By this construction a pulling force on the rod $M^2$ will bring all of the bars toward and into a common horizontal plane, and a retractile action of the spring $M^3$ will divert each of the bars from said common plane in proportion to the distance of the movement of the rod $M^2$. It therefore remains to give the necessary pulling movement to the bar $M^2$. If a compression-spring be used instead of the spring $M^3$, it is apparent that the movement required by the rod $M^2$ would be a push movement; but these little details, as before stated, are not essentially included in my invention, nor is my invention essentially dependent thereon. The required movement of the rod $M^2$ in this instance is provided for by connecting said rod by link $M^5$ (see Figs. 4, 6, and 8) with a disk $M^6$, a friction-spring $M^7$ extending from the frame-bars upon the periphery of the disk for the purpose of retaining it in a position given to it. Now with the devices thus far described—that is, the disk, the friction device, and suitable connection with the rod $M^2$—it is apparent that the individual bars of the battery may be adjusted by moving the disk by hand or the bar, when the adjustment will be retained by the friction-spring. A series of points of connection may be made upon the disk for the link $M^5$, so as to change said point of connection and the amount of movement of the bar with relation to the rotation of the disk. This feature of the changing of the point of connection is perhaps of greater utility in connection with a further feature of my improvements now to be described.

Figure 7:
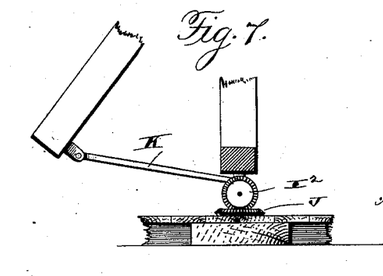

Instead of connecting the rod K, extending from the crank-shaft I, directly to the battery-frame, as hereinbefore described, and shown in full lines in Figs. 4 and 7, I may connect it with the disk $M^6$, as shown by dotted lines in Fig. 4 and full lines in Fig. 6. Now it will be seen that the adjustment of the bars has been rendered automatic and will take place in accordance with the rotation of the crank-shaft I, which itself is controlled by the movement of the car on the track, so that not only the inclination of the battery is changed as a whole to agree with the elevation of the sun at different periods of the day, but the inclination of the individual bars is varied also in accordance with the same condition; also, by attaching the strap to the crank and disconnecting the connecting-rod, the large frame being fixed, the rows of mirrors may be moved instead of the large frame. Here, too, comes in an advantage of the various points of connection with the disk $M^6$; but instead of changing the connection of the link therewith it may be that of the connecting-rod K with said disk, so that the variation of the individual bars shall be from a different predetermined point when the connecting-rod is into the disk at one of the points of connection $M^{6\times}$ from that at which the adjustment would begin if the said rod was connected at any of the said points of connection $M^{6\times}$. In some seasons of the year a greater movement of the disk would be required, and therefore taking the crank in the position farthest back in the morning and connecting it with the nearest point $M^{6\times}$ a rotation of the crank would move the link and rod a greater distance by noon than if it were connected with a point $M^{6\times}$ nearest the center of the disk.

In Fig. 11 the gearing employed for operating the crank-shaft is shown, and at the right a pawl-and-ratchet mechanism is illustrated which is connected with the gear $I^2$, that, as hereinbefore described, might be fixed to the crank-shaft; but instead of fixing said gear directly to the crank-shaft the pawl-and-ratchet mechanism $I^{\times\times}$, (shown in Fig. 11,) may be interposed between the shaft and the gear $I^2$, so that the pawl may be released from the ratchet, thus breaking connection between the gear and the shaft in order that the battery-frame may be adjusted independently of the gear, if desired. So, also, this pawl-and-ratchet mechanism may be used as the means for changing the position of the crank independently of the position of the car on the track and the connecting mechanism leading up to the said crank, whereby the battery-frame and its supporting-frame $E'$ may be adjusted with relation to the car on the track independently of the gearing existing between these two parts of the apparatus. There may be conditions or circumstances in which the position of the battery of reflectors is desired to be other than directly at a right angle to the center line of the connecting-bar D, and this connection of the gearing permits of independent movement of the battery. It also permits of independent inclination of the battery-frame G and the battery, as well as of independent adjustment of the individual reflecting-bars on the battery.

Figure 24:
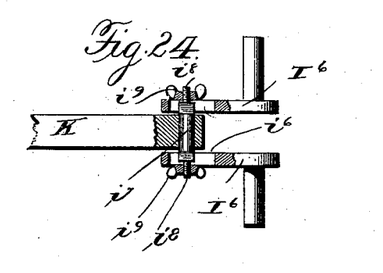
Fig. 24 is an enlarged detail, partly in elevation and partly in section, with portions broken away, showing means for adjustment of the crank-shaft.

The crank-shaft is rendered adjustable to suit different seasons of the year. One convenient form of adjustability is seen in Fig. 24, in which the parallel arms $I^6$ thereof are shown as provided with the longitudinal slots $i^6$, through which pass the ends of the bolt $i^7$, with which the end of the connecting-rod K is connected, and the ends of this bolt are extended and screw-threaded, as seen at $i^8$, to receive the thumb-nuts $i^9$, by means of which all necessary adjustment is accomplished. This, however, is but one of the numerous forms of adjustment that may be provided.

It now remains to describe the construction of the reflecting-bars and the reflectors therein. While it is true that any suitable reflecting-surface may be employed in the apparatus shown and hereinbefore described, there are certain advantages of construction which contribute not only to long service and effective work, but to convenience in manipulation and still finer adjustment than as yet described. It is universally known that the sun is constantly changing its position from morning till evening, and it is perhaps assumed to be a simple matter to provide ordinary clockwork controlling mechanism for causing a reflector to keep opposite the sun during its daily travel; but in order to utilize the greatest possible number or quantity of the solar rays it is essential not only to control an apparatus so as to travel in the horizontal curved path, but to change the inclination of the surface to follow the elevation and depression of the sun which occurs each day, and even if these conditions are provided for it is desirable to provide a surface of such a large extent as to utilize as many solar rays as possible. Although a very large area of reflecting-surface may be employed, yet it is desirable to save all waste of the solar rays, which is easily accomplished by my device.

Elevating the object to be heated a distance above the car permits the utilization of a greater number of rays when the sun is at its highest point.

From the above it is seen that even if the reflecting-bars L were plain reflecting-surfaces of any kind the advantages of the individual adjustment hereinbefore described would be secured by the means suggested; but if irregularity existed in said surfaces and at different points relatively in each of the bars it is plain that the entire battery would be defective to that extent and that a greater or less percentage of the solar rays received thereby would be dispelled rather than directed to a common field for effective work. For these reasons I have devised means whereby each and every bar and each and every member of a series constituting a bar may be properly regulated, positioned, and adjusted to do effective work and to avoid any loss of solar heat.

Figure 13:
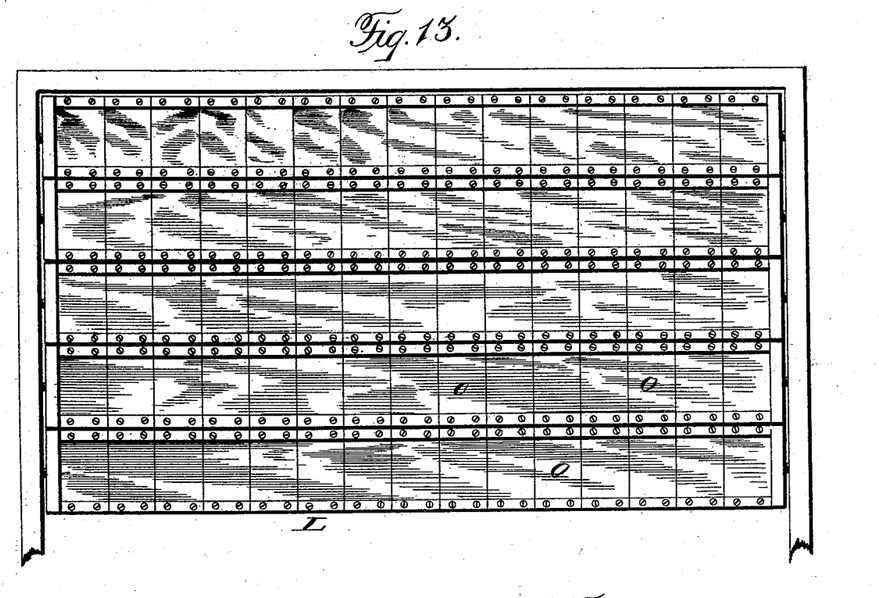
Figs. 13 to 16ª, inclusive, are details of the reflectors and their mounts.
Figure 14:
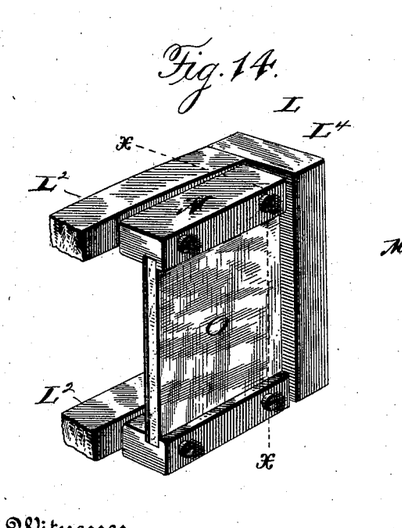
Figure 15:
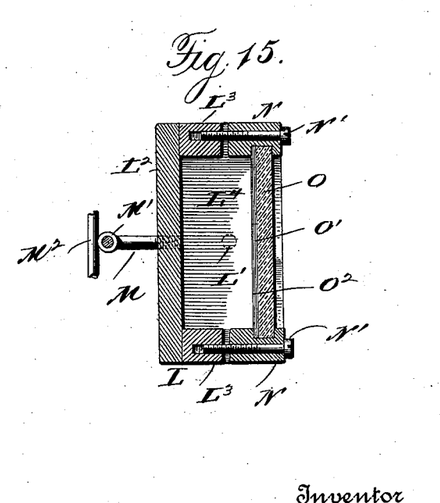

Referring to Fig. 9 and to Figs. 13 to $16^a$, inclusive, it will be seen that I construct each of the bars of a base $L^2$, (see Fig. 15,) from which the rods M project and are pivotally connected at $M'$ to the rod $M^2$. Upon this base are secured longitudinal bars $L^3$ and end boards $L^4$, in which the gudgeons $L'$ are secured. Other bars N are arranged over the bars $L^3$, and both bars are perforated for the passage of screws or bolts $N'$. Upon their inner faces the bars N are grooved for the reception of a sheet or sheets of glass O, backed by any suitable material $O'$, having a polished or reflective surface, and this may be backed by a sheet or sheets of protecting material $O^2$. The reflective surface may be silver on the glass, as in ordinary mirrors, or it may be a sheet of silver, aluminium, tin, or other bright metal, and the back may be of wood, paper, or any other suitable material. Now it is apparent that by running the grooves $N'$ in or out the reflecting-surfaces may be caused to assume a plane inclined with relation to the base $L^2$. Therefore in a battery of such reflectors and when in use if it be discovered that the reflective surface of a bar, whether comprised of one continuous material or of a series of smaller reflectors, as shown in Fig. 13, is out of a true reflecting-plane of the battery as a whole it can be readily corrected by the use of an ordinary screw-driver. As shown in Fig. 16, the base $L^2$ may be curved so as to produce a large reflecting-surface which is concaved, the various planes of the surfaces of the sections constituting the bar being approximately in parallelism with the curvature of the base by the means of adjustment above described. I find by experience that the variations of a scientifically accurate parabolic curvature of these numerous plane surfaces are by my methods very perfect so far as practical utilization of all of the rays reflected by the battery is concerned, and the larger the surface employed the less accuracy is necessary to obtain an intense heat. In case the reflector-bar is made concaved or curved, as shown in Fig. 16, the bars N may be short, so as to embrace each individual reflecting-surface O only, or they may extend to embrace two or more of them, (see Fig. 14, which is a section on the line $x$ of Fig. 16;) but it is preferable to secure independent adjustment of each individual reflecting-surface O by short embracing bars N, as clearly shown in Fig. 14. This construction is clearly shown in Fig. 14 and also in Fig. 15, which is a section on the line $x$ $x$ of Fig. 14.

What I claim is—

1. In a solar apparatus, a curved track, a car thereon, a reflector within the space bounded by the track, and an object mounted upon the car to travel across the same and to receive the rays from the reflector, substantially as specified.

2. A reflector, a curved track, a car, and means positively connecting the car with the reflector for changing the position of the support of the reflector with relation to the car, substantially as specified.

3. A reflector, a curved track, a car, means positively connecting the reflector and the car, and mechanism for adjusting the relative position of the support of the reflector and the car by the movement of the car, substantially as specified.

4. A reflector, a curved track, a car, a truck mounted to travel across the car and means for adjusting the position of the truck, substantially as specified.

5. A curved track, a car, a rotatable reflector-supporting frame positively connected with the car, a reflector mounted in said frame, a gearing interposed between the reflector and a relatively-fixed part for receiving movement by the movement of the car upon the track, substantially as specified.

6. A curved track, a car, a reflector-supporting frame pivotally mounted, a positive connection of the car with the said frame so as to move the same upon or about its pivot, a fixed gear, an interposed gearing between the reflector and fixed gear for moving the reflector with relation to the movement of the car, substantially as specified.

7. A series of individual reflectors mounted in a common frame which is in turn pivotally mounted and devices for simultaneously adjusting said individual reflectors, substantially as specified.

8. A reflector composed of individual reflecting-surfaces mounted in a movable frame and each connected to a common adjusting device, and means for operating said device, substantially as specified.

9. A reflector composed of individual reflecting devices connected to a common adjusting device, means for regulating the latter, and a friction device for retaining said means in an adjusted position, substantially as specified.

10. A reflector composed of individual reflectors each connected with a common adjusting device, a rotatory supporting-frame for said reflector, a fixed support for said frame, and gearing interposed between said fixed support and the common adjusting device for regulating the position of the individual reflectors, substantially as specified.

11. A rotatable reflector-supporting frame and a reflector mounted thereon, a fixed gear, rotatable gearing mounted on the frame, and a connection between the same and the reflector, substantially as specified.

12. A rotatable reflector-carrying frame, a fixed gear, rotatable gearing mounted on the frame and having means for disconnecting the gearing, substantially as specified.

13. A rotatable reflector-frame, a fixed gear, a rotatable gearing mounted on a crank-shaft carried by the frame, and means for disconnecting the crank-shaft from the gearing mounted thereon, substantially as specified.

14. A rotatable reflector-carrying frame, a reflector mounted therein composed of individual reflecting-surfaces with each connected with a common adjusting device, a disk connected with said device, and a rod connecting said disk with a crank-shaft, a rotatable reflector-frame carrying said crank, and gearing adapted to receive motion through the rotation of said frame, substantially as specified.

15. A rotatable reflector-frame, gearing receiving motion from the movement of said frame, a connecting-rod extending from said gearing to a disk provided with means for attaching said rod at different points on said disk, and an adjusting device operatively connected with said disk and with a series of individual reflectors, substantially as specified.

16. In a solar apparatus, a track-support consisting of a post for supporting the rail, an apertured bed-plate through which the post passes, and means for adjustably securing the post in the bed-plate, substantially as specified.

17. The combination of the rail $a$, post $A^2$, bed-plate $A^3$ and the adjustable securing device $A^4$, substantially as specified.

18. In a solar apparatus, the car C having the tracks $H^7$ and the truck $H^5$ $H^6$ mounted to travel across the car and means for adjusting the position of the truck upon the car, substantially as specified.

19. In a solar apparatus, a curved track, a car, a truck mounted to travel across the car, a cable and a windlass, suitable cable-guiding pulleys, a car-propelling weight, and a time-measuring device operatively connected with the weight and with the windlass, substantially as specified.

20. In a solar apparatus, a reflector, a car, a curved track, a truck mounted to move across the car, a steam-producing boiler mounted upon the truck, steam-operated mechanism, and a connection between the boiler and said mechanism, substantially as specified.

21. In a solar apparatus, a reflector, a curved track, a car mounted to traverse the same and positively connected with the reflector, a steam-producing boiler mounted upon the car, and steam-operated mechanism flexibly connected with the boiler, substantially as specified.

22. In a solar apparatus, a reflector, a car movable about the reflector, an elevated platform mounted on a truck constructed to travel across the car, and an object to be heated mounted on the platform, substantially as specified.

23. In a solar apparatus, a reflector, a car movable about the reflector, and an object to be heated by the reflector carried by and elevated above the car, substantially as specified.

24. In a solar apparatus, a car having an elevated platform and means for reaching the same and for exposing the object to rays from the reflector upon or above the platform, substantially as specified.

25. The combination with the car, of the truck $H^5 H^6$ the threaded shaft $H^8$ and nut $H^9$, substantially as shown and described.

26. The combination of the car C, the truck $H^5$, the boiler H, the supply-pipe $H'$ and the delivery-pipe $H^{11}$, substantially as specified.

27. The combination with the reflector-frame $E'$ and its pivot E, of the base F, the gears $J I^2$ and crank-shaft I, the connecting-rod K and the frame G, substantially as shown and described.

28. The combination with the frame E E' car C track A and connecting-rod D, of the frame G connecting-rod K and gearing $I I^2$ and J, substantially as specified.

29. The combination of the frame G carrying the reflectors L, the rods $M M^2$, spring $M^3$, disk $M^6$, connecting-rod K, and gearing $I I^2$ and J, substantially as specified.

30. The combination of the frame G, individual bars L having journals $L'$, the plate $G^2$ having aperture $G^3$ and slot $G^4$, and means for securing the plate adjustably to the frame G, substantially as specified.

31. A reflector consisting of a base, a reflecting-surface, bars for supporting the same movably mounted on the base, and means for adjustably connecting the bars with the base, substantially as specified.

32. A reflector consisting of the base $L^2$, grooved bars N, and devices as $N'$ for adjustably connecting the grooved bars with the base, substantially as specified.

33. In a solar apparatus, a gear having removable devices constituting the cogs thereof, substantially as specified.

34. In a solar apparatus, a gear having removable and adjustable devices constituting the cogs thereof, substantially as specified.

35. In a solar apparatus, a gear provided with cogs adjustable to follow the irregular motion of the sun, substantially as specified.

36. In a solar apparatus, the combination with a reflector, a curved track, a car, and means positively connecting the car with the reflector, of a crank-shaft and its connecting-rod having means for adjustment to suit the different seasons of the year, substantially as specified.

In testimony whereof I affix my signature in presence of two witnesses.

WILLIAM CALVER.

Witnesses:
 E. B. STOCKING,
 L. P. WHITAKER.